March 29, 1932.  H. C. DRAKE ET AL  1,851,818
TESTING DEVICE
Filed May 27, 1929
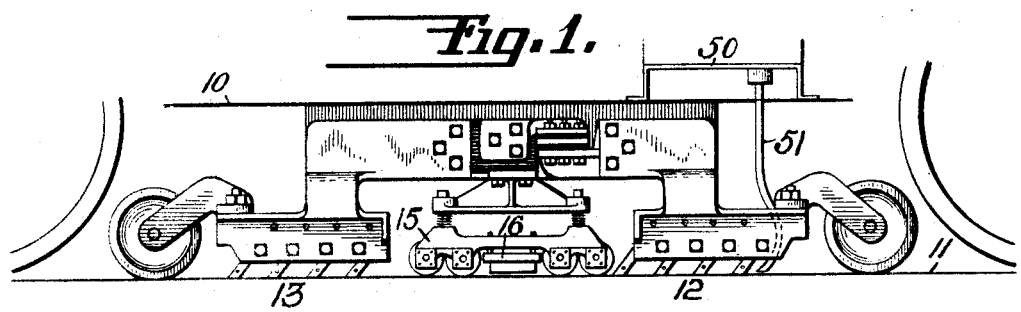
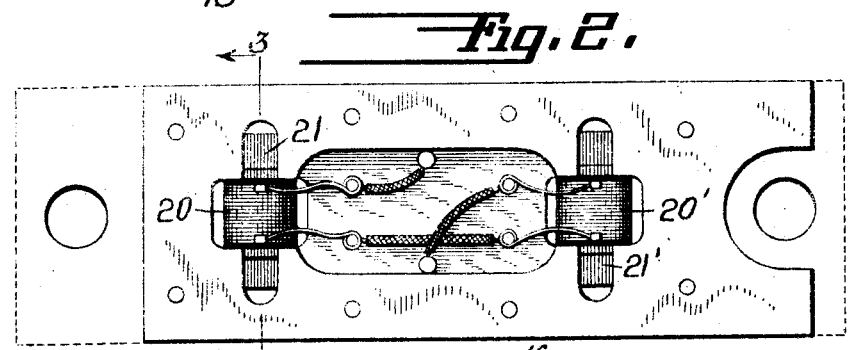
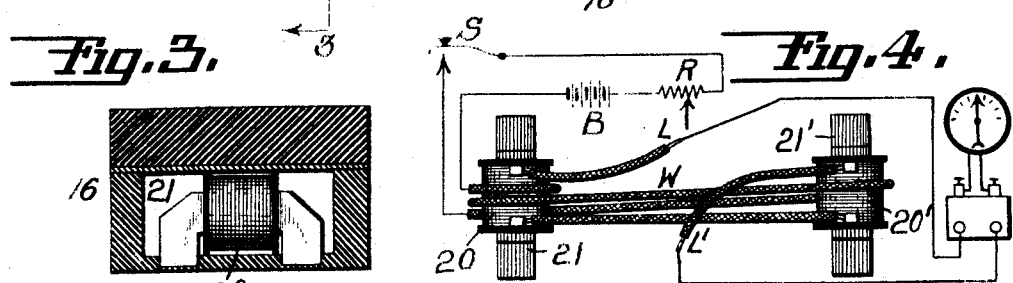
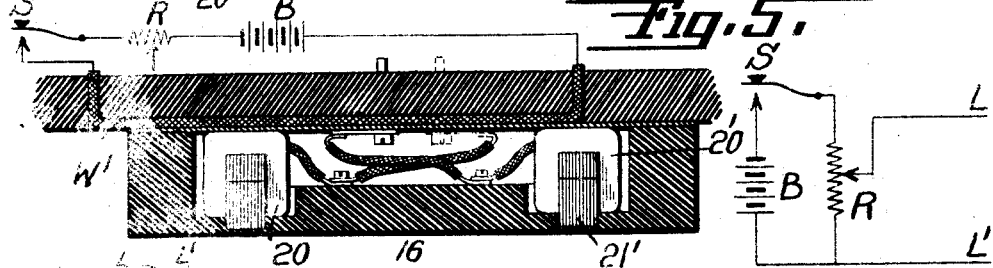
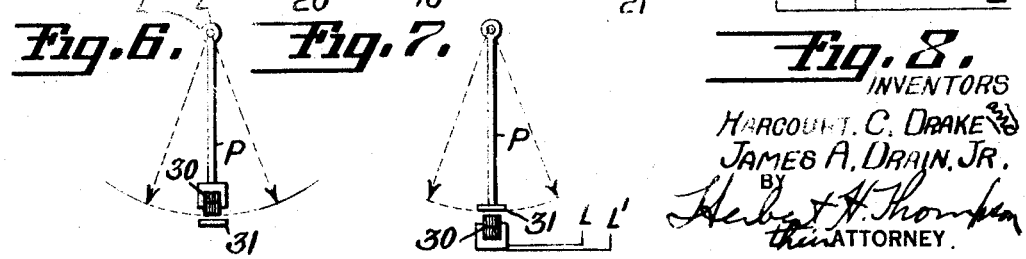
INVENTORS
HARCOURT C. DRAKE
JAMES A. DRAIN, JR.
BY
Herbert H. Thompson
their ATTORNEY.

Patented Mar. 29, 1932

1,851,818

UNITED STATES PATENT OFFICE

HARCOURT C. DRAKE, OF HEMPSTEAD, NEW YORK, AND JAMES A. DRAIN, JR., OF CHICAGO, ILLINOIS, ASSIGNORS, BY MESNE ASSIGNMENTS, TO SPERRY PRODUCTS, INC., OF BROOKLYN, NEW YORK, A CORPORATION OF NEW YORK

TESTING DEVICE

Application filed May 27, 1929. Serial No. 366,361.

This invention relates to means for testing the sensitivity and accuracy of measuring or indicating means employed to give an indication of variations of magnetic flow. Such instruments are employed in a variety of fields, but particularly for the purpose of indicating and measuring flaws in rails and similar material wherein a magnetic flux is sent through the material to establish a magnetic field, and the variations in position of said field caused by defects within the material are caused to induce an E. M. F. which is indicated upon a suitable indicating instrument either with or without amplification. The principle involved in this invention consists in creating a flux variation of known dimension to induce an E. M. F. of known degree or to actuate the measuring instrument to a known degree.

A further object of this invention is the provision of means for improving the efficiency of flaw detecting means of the type described above.

In the accompanying drawings

Fig. 1 is a side elevation of a rail fissure detector car to which our invention may be applied.

Fig. 2 is a plan view of the Fig. 1 device.

Fig. 3 is a cross section taken on the line 3—3 of Fig. 2.

Fig. 4 is a view largely diagrammatic showing one form of our invention applied to the Figs. 1 to 3 device.

Fig. 5 is a vertical section through a portion of the Figs. 1 and 2 device showing a second embodiment of our invention.

Fig. 6 is an elevation of a third embodiment of our invention.

Fig. 7 is an elevation similar to Fig. 6 of a fourth embodiment of our invention similar to that of Fig. 6.

Fig. 8 is a wiring diagram illustrating a fifth embodiment of our invention.

In the accompanying drawings we have shown our invention as applied to a rail fissure detector car of the type disclosed in the copending application of Elmer A. Sperry, Serial No. 298,771, filed August 10, 1928, now Patent No. 1,820,505. It will be understood, however, that the invention has general application, as hereinbefore stated and as claimed hereinafter. The form of flux detector and measurer illustrated in Figs. 1 to 5 inclusive consists of a car 10, only a portion of which is shown, the said car carrying a generator (not shown) for delivering into the rail 11, upon which said car travels, the generated current through brushes 12 and 13. The flow of current through the rail 11 establishes a magnetic field surrounding the same which, if the rail is of uniform consistency without defects, will be uniform in extent. For measuring the flux or for indicating variations in flux through the rail there is provided a carriage 15 adapted to have fixed thereto a support 16 within which is mounted a pair of electro-magnets in the form of opposed coils 20 and 20′ surrounding magnets 21—21′. The said U-shaped magnets have their ends supported adjacent to but out of contact with the rail surface. The flux extends through the coils and as long as said flux is uniform no differential E. M. F. is induced therein. When, however, a flaw or defect in the rail is encountered, the magnetic field surrounding said rail is shifted, and this variation in flux induces a differential E. M. F. in the said coils adjacent said portion of the rail where the defect occurs.

The said variation in flux, due to the defect, is, therefore, detected by a single coil as the car 10 passes over that portion of the rail, and the provision of the two coils spaced apart will result in both coils successively detecting the defect as the car passes thereover. The reason for providing two coils where one coil would be sufficient to detect the variation in flux is to take care of variations in relative speed between the car 10 and the rail which would result in varying the lines of flux through the coils, and also to take care of any variations in the current sent through the rail, which also would result in variations of flux. The provision of two coils oppositely connected, as shown in Fig. 2, neutralizes such variations and, therefore, only the variations due to defects in the rails with resultant displacement of the magnetic field at the said point is detected by this device, since only one coil at a time encounters such defect, and hence there is no counter-balancing or neutralization of such variation and the said variation is, therefore, transmitted to the indicating device. The induced differential E. M. F. may be amplified by a suitable thermionic amplifying device and thence caused to actuate a suitable indicator or may be detected in earphones.

The above structure and functioning thereof is described in greater detail and is claimed in the said Sperry application cited herein and forms no part of the present invention.

If anything went wrong in the above described detecting mechanism, such as a short circuit or the like, obviously there would result an incorrect indication of a flaw or defect in material which did not in fact exist. We provide means, therefore, for enabling the operator to test at will the sensitivity of the indicating apparatus whereby he may discover whether there is anything unusual or defective in his indicating system. For this purpose, in the Fig. 4 form of our invention, we provide means for inducing a differential E. M. F. of known strength which should yield a known degree of actuation of the indicator. This means may take the form of a wire wound oppositely about the two coils 20—20′ successively but with more turns about one coil than about the other. The ends of said wire are connected to a source of E. M. F. such as battery B and by closing a switch S the operator may impress a voltage from battery B on the wire W wound around said coils and hence induce a greater E. M. F. in coil 20 than in coil 20′. This will result in actuation of the indicator. A rheostat R may be provided for adjusting the impressed E. M. F. so that normally whenever switch S is closed a given degree of actuation of the indicator is obtained, as for instance, a known number of degrees on the indicating dial. If, therefore, when the switch S is depressed and a different actuation is obtained on the indicator, then the operator knows that there is a defective condition inherent in his indicating apparatus which will, if not corrected, result in an incorrect indication of the magnetic flux through the material being tested.

Similar in principle is the form of the invention disclosed in Fig. 5. Instead of a wire W wrapped a greater number of times around one coil than the other, we may provide a wire W′ unsymmetrically disposed with respect to said coils 20 and 20′ which will yield the same effect when the current is passed therethrough as the unequal number of turns about the said coil. A similar switch S, resistance R, battery B, are connected to wire W′ as to wire W. The action of this device is exactly the same as the Fig. 4 device.

In the Fig. 8 form of the invention we have substantially the same units, switch S, battery B and resistance R, but instead of employing these to send a current through an auxiliary conductor displaced with respect to the coils 20—20′, we send this current directly into the input of the indicator by connecting the same to the leads L, L′ from coils 20 and 20′ extending to the said indicator. The action of this form of the device is obvious.

A somewhat different form for enabling the operator intentionally to induce a known E. M. F. in the indicator circuit is disclosed in Figs. 6 and 7. This comprises a small auxiliary electro-magnet 30 connected into the input of the indicator and adapted to have relative movement with respect to a conductor 31. In the Fig. 6 form of the invention the electro-magnet is carried by a pendulum P and moves with respect to the fixed conductor 31, while in the Fig. 7 form the electro-magnet is fixed and the pendulum carries the conductor 31. In either case the result is the same, the relative movement between the two causing an E. M. F. of known dimension to be impressed on the indicator circuit so that the operator may know whether the said indicating circuit is of the proper degree of sensitivity.

We may provide means for improving the efficiency of the testing device hereinbefore described by providing means for insuring a better contact between brushes 12 and 13 and the material to be tested. This improved contact will increase the conductivity, thus cutting down the voltage and increasing the amperage through the material to be tested to give a more efficient indication. For this purpose we may employ a reservoir 50 containing a fluid having electric conducting properties and direct said fluid down to the material to be tested by a suitable means such as tube 51 to a point in advance of the forward brushes 12. The material to be tested is thus sprayed or otherwise flushed by the conducting fluid to provide better contact between the brushes and the material to be tested as hereinbefore stated. The said fluid serves still another purpose in that it will wash away such impurities as sand and dirt which would otherwise be dragged beneath the brushes to form poor contacts and even to give an incorrect indication of flaws which do not exist.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. The combination with an electric circuit including a source of E. M. F., flux responsive means, and means for indicating magnetic flux, of an independent electric circuit including a separate source of E. M. F. for impressing a flux of known magnitude on said flux responsive means, said independent circuit including a coil and a conductor relatively movable with respect to each other.

2. The combination with an electric circuit including a source of E. M. F., means responsive to variations in magnetic flux, and means for indicating said variations in flux, of an independent electric circuit including a separate source of E. M. F. for impressing a known variation of flux on said flux responsive means, said independent circuit including a coil and a conductor relatively movable with respect to each other and a pendulum carrying one of said relatively movable elements.

3. The combination with an electric circuit including a source of E. M. F., means responsive to relative variations in magnetic flux, and means for indicating said relative variations in flux, of an independent electric circuit including a separate source of E. M. F. for impressing a known relative variation of flux on said flux responsive means, said independent circuit including a coil and a conductor relatively movable with respect to each other, and a pendulum carrying said coil.

4. The combination with an electric circuit including a source of E. M. F., a plurality of means responsive to variations in magnetic flux and connected in opposition, and means for indicating relative variations in flux in said responsive means, of an independent electric circuit including a separate source of E. M. F. for impressing a flux of known degree on said responsive means.

5. The combination with an electric circuit including a source of E. M. F., a plurality of means responsive to variations in magnetic flux and connected in opposition, and means for indicating relative variations in flux in said responsive means, of an independent electric circuit including a separate source of E. M. F. for impressing a flux of known degree unequally on said responsive means.

6. The combination with an electric circuit including a source of E. M. F., a plurality of means responsive to variations in magnetic flux and connected in opposition, and means for indicating relative variations in flux in said responsive means, of an independent electric circuit including a separate source of E. M. F. for impressing a flux of known degree on said responsive means, said last named means being unsymmetrically disposed with respect to said responsive means to set up a known relative variation of flux therein.

7. The combination with an electric circuit including a source of E. M. F., means responsive to relative variations in magnetic flux, and means for indicating said relative variations in flux, of an independent electric circuit including a separate source of E. M. F. for impressing a known relative variation of flux on said flux-responsive means, said independent circuit including a coil and a conductor relatively movable with respect to each other, and a pendulum carrying said conductor.

In testimony whereof we have affixed our signatures.

HARCOURT C. DRAKE.
JAMES A. DRAIN, Jr.